H. J. FERRIS.
STALL CONSTRUCTION.
APPLICATION FILED MAR. 27, 1914. RENEWED AUG. 15, 1916.
1,207,286.
Patented Dec. 5, 1916.
3 SHEETS—SHEET 3.
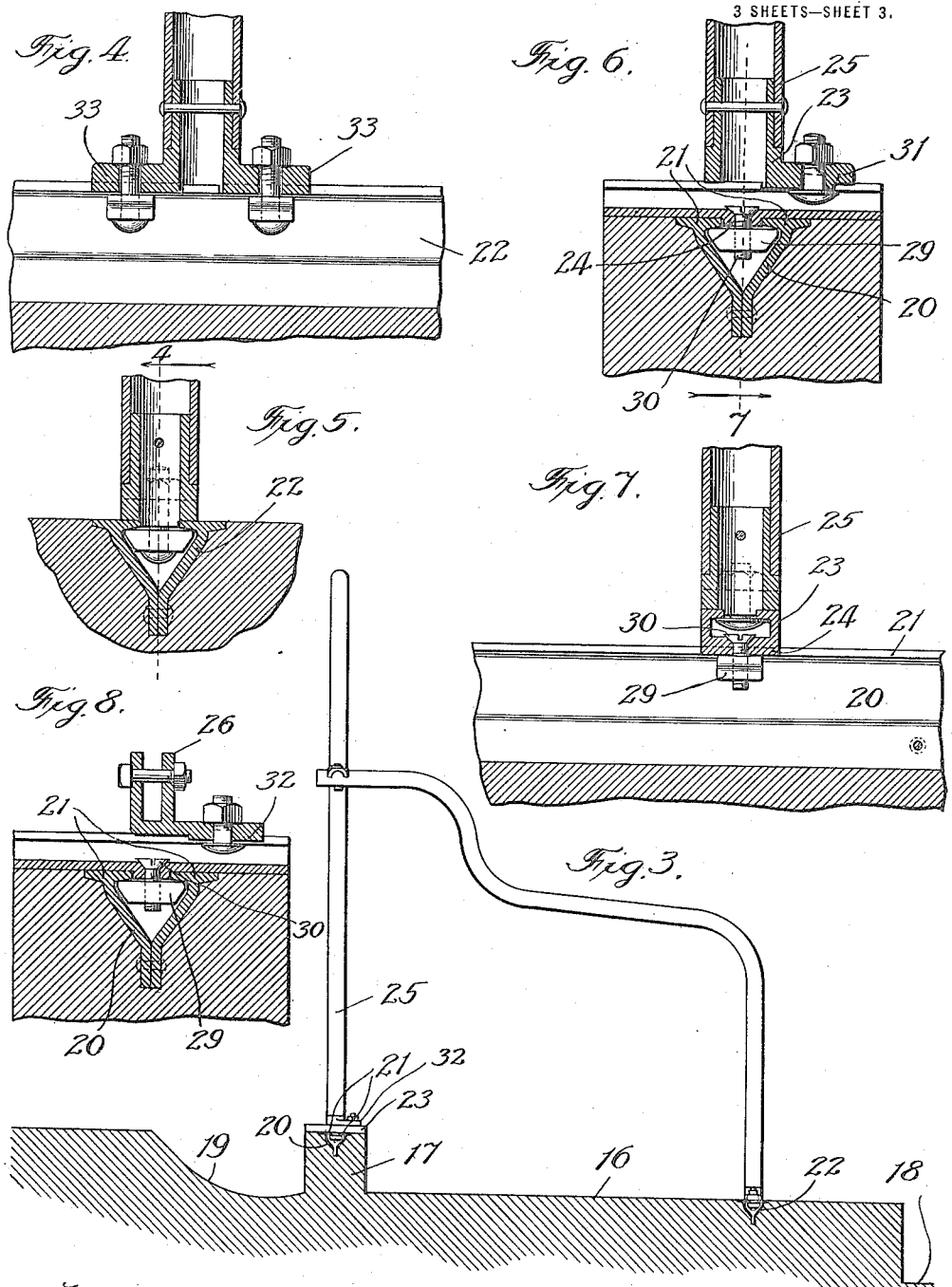

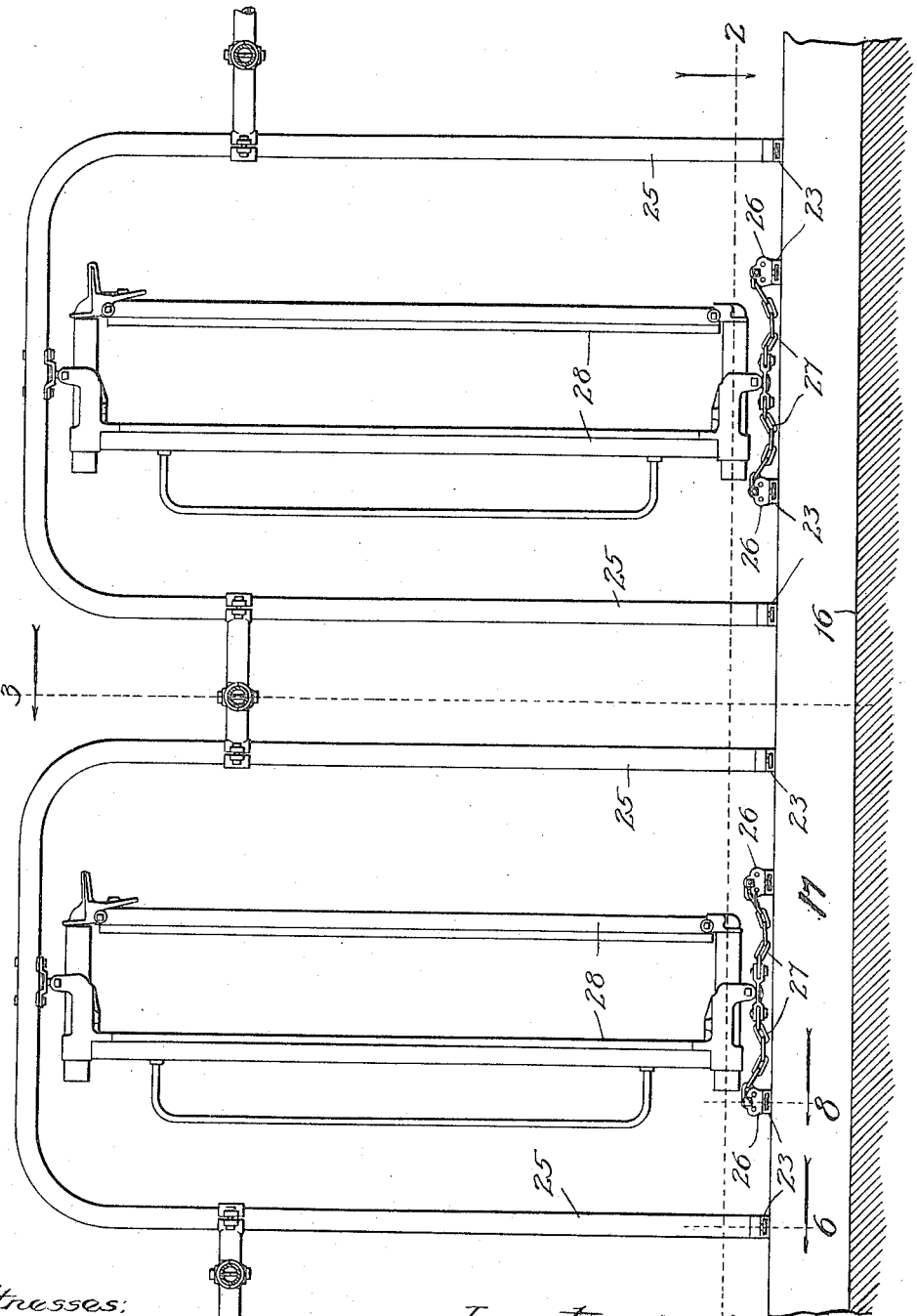

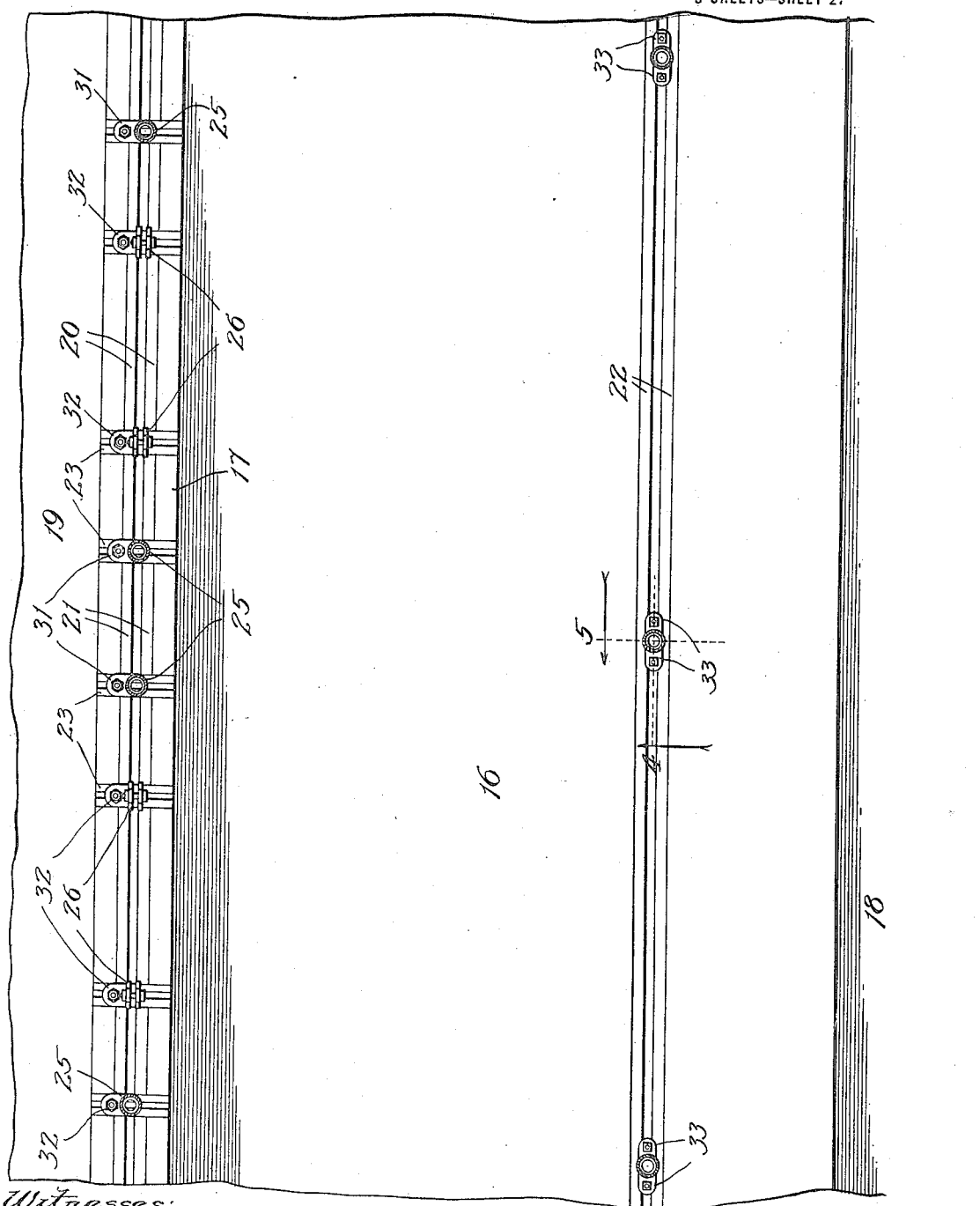

UNITED STATES PATENT OFFICE.

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

STALL CONSTRUCTION.

1,207,286.  Specification of Letters Patent.  Patented Dec. 5, 1916.

Application filed March 27, 1914, Serial No. 827,646. Renewed August 15, 1916. Serial No. 115,087.

*To all whom it may concern:*

Be it known that I, HOWARD J. FERRIS, a citizen of the United States, residing at Harvard, in the county of McHenry and State of Illinois, have invented a new and useful Improvement in Stall Construction, of which the following is a specification.

My invention relates to certain new and useful improvements in stall construction and is fully described and explained in the specification and shown in the accompanying drawings, in which:

Figure 1 is a front elevation showing a portion of a series of stalls embodying my improvement; Fig. 2 is a section on the line 2 of Fig. 1; Fig. 3 is a longitudinal section on the line 3 of Fig. 1; Fig. 4 is a section on line 4 of Fig. 2; Fig. 5 is a section on the line 5 of Fig. 2; Fig. 6 is a section on the line 6 of Fig. 1; Fig. 7 is a section on the line 7 of Fig. 6; Fig. 8 is a section on the line 8 of Fig. 1.

Before proceeding to the detailed description of the structure herein illustrated, I will, by way of introduction, explain the general purpose sought to be accomplished so that the purpose of each portion of the device will be the more readily understood when its structure is explained. Of recent years, it has become the practice to make up cattle stalls in different sizes and to sell them in units, it being thus possible to purchase as many stalls as are desired and erect them in a series of any desired length. However, the stalls are customarily made in three widths, 3 feet, 3 feet 3 inches, and 3 feet 6 inches, and in accordance with the practice which has heretofore prevailed, the builder has had to plan, in advance, how many stalls he would use and of what sizes, in order to place in the concrete of the barn-floor and in the curb, the necessary attaching means to receive the stalls ultimately to be used. While it has not been necessary to purchase the stalls all in advance, it has heretofore been necessary to plan for all of them in advance and place the necessary anchors in the proper places. Furthermore, in order to facilitate proper erection, the stall manufacturers have found it necessary to supply templets to be used in properly positioning the anchors. In a common form of stall construction, the anchors have been bolts set in the curb and barn-floor. Two bolts were required in the curb at each side of each stall. The two bolts of each pair had to be spaced from each other the requisite distance to coöperate with the perforations in that part of the stall construction which they were to receive, and the pairs had to be spaced apart the width of the desired stall. As a result, the manufacturers have supplied the bolts fastened in place in metal templets the width of the curb, and the templets were nailed in place on the wooden curb molds before the concrete was poured therein. In addition to the templets which held each pair of bolts, it was necessary to supply one longitudinal templet for each length of stall which was going to be built, in order that by their use the separate pairs of bolts might be properly spaced. One purchaser therefore received as many transverse templets as he had stalls, plus one, and as many longitudinal templets, in addition, as he intended to erect widths of stalls. The cost of these templets, and of assembling the bolts therewith before shipped, has been very considerable. In addition, the local dealer found it exceedingly difficult to maintain a stock of the longitudinal templets so as to have enough of each kind at the end of a season.

The object of the present invention is to dispense entirely with the use of these templets which have heretofore been necessary, and furthermore to provide a type of construction which can be added to from time to time as required without any necessity of planning in advance what the width of the stalls are to be. With it, also, it is possible to change from wide to narrow stalls or vice versa at any time after the structure is completed, and this manifestly could not be done with the common types of devices in use.

In the accompanying drawing, 16 is the barn floor, 17, the curb, 18, the gutter and 19, the feed-trough, all arranged in accordance with common practice. Laid in the top of the curb is a longitudinally-extending track 20 having inturned flanges 21 so as to provide along the top of the curb a way constricted at its top. A similar track 22 is laid in the floor in the line of the rear end of the partitions between adjacent stalls.

Upon the top of the curb and extending transversely thereof is a series of transverse tracks 23 each of which is constricted at the top and has a central downwardly-projecting rib 24 lying in the central depression of the track 20 to hold the transverse tracks in proper angular position across the curb. Four of these transverse tracks 23 are preferably provided for each stall, two to support the end of the stall frame 25 and two to support the castings 26 which receive the ends of chains 27 which are attached to the bottom of a stanchion 28.

In order to hold the cross-tracks 23 in proper position on the curb, they are provided with blocks 29 in the longitudinal tracks 20 and slidable therein, which blocks are engaged by screws 30 passing through the bottom of the cross-tracks. In order to secure the frame-ends and castings 26 in the cross-tracks, a somewhat similar arrangement is adopted. The frame-ends have projections 31 and the castings 26 have projections 32, each provided on its lower surface with a rib to enter the slot of the cross-tracks, each perforated for the passage of a bolt, the head of which lies within the hollow of the cross-track to hold the corresponding part firmly, but adjustably, in position.

The rear ends of the partitions are longitudinally adjustable along the track 22 in a generally similar manner, the difference being merely that the rear ends of the partitions are provided with two oppositely extending ears 33 to engage the track 22. The stall front is adjustable transversely of the curb and longitudinally of the stall, at its lower end, in an obvious manner, and at its upper end is made adjustable on the partitions, in accordance with what is now common practice.

The assembling of the present structure will be readily understood. When a farmer builds his barn, he places the tracks 20 and 22 in position in the concrete and extends them the entire length of the space ultimately to be occupied by stalls. He need pay no attention to the size of stalls he intends to put in, nor to the number which he hopes ultimately to use. He requires no templets and no other permanent anchor than these long tracks. From time to time, as needed, the stalls can be erected of any size by simply sliding in the four cross-tracks on the curb, and the partition-supports at the rear, and bolting the parts together.

I am aware that considerable variation is possible in the details of the construction described. It is, of course, applicable to stalls where the frame front is made adjustable transversely of the curb and to those in which it is not, as well as that type provided with partitions between the stalls of the series. These styles of construction are common in the art and the invention has no necessary relation thereto, although when the partitions are used, it is convenient to provide for their adjustment in the manner shown. Thus in view of the great changes which may be made without departing from the spirit of my invention, it will be evident that I do not intend to limit myself to the specific form herein shown, except as pointed out in the following claims, in which it is my intention to set forth all the novelty inherent in the structure described as broadly as is permitted by the state of the art.

I claim as new and desire to secure by Letters Patent:—

1. In stable equipment, in combination, a stationary concrete curb, stall frame parts adapted to be mounted thereon, a fastening way permanently embedded in said curb substantially flush with the surface thereof and longitudinally disposed relative thereto, and clamping devices associated with said stall frame parts and having means engaging with and adjustable longitudinally of said fastening way.

2. In stable equipment, in combination, a stationary concrete curb, a longitudinally disposed metallic way permanently embedded in said curb substantially flush with the surface thereof, stall frame parts of stock size adapted to be mounted on said curb, a second longitudinally disposed metallic way embedded in the concrete floor of the stable in the rear of said curb and substantially flush with the floor surface, and clamping means associated with said stall frame parts adapted to engage said longitudinally disposed ways and clamp the frame parts in any desired adjusted position therealong.

3. In stable equipment, in combination, a stationary concrete curb, stall frame parts adapted to be mounted thereon, a fastening way carried by said curb and longitudinally disposed relative thereto, transverse ways mounted on the longitudinal way, connecting means between said longitudinal and transverse ways whereby the latter may be adjusted along the former, and clamping devices connecting the stall frame parts with said transverse ways, whereby said parts may be adjusted longitudinally and transversely of the curb.

4. In stable equipment, in combination, a concrete floor and curb, a plurality of stanchion supports adapted to be mounted upon said curb, ways permanently embedded in the concrete curb substantially flush with the surface thereof, co-acting members adjustably mounted in said ways for clamping the stanchion supports at any desired point along said curb, a second way embedded in the concrete floor in the rear of said curb and co-acting members adjustably mounted in said ways for supporting partitions between said stanchion supports.

5. In stable equipment, the combination with stall frame parts, of longitudinal and transverse ways having inturned flanges spaced apart at their opposed edges to form an opening restricted at its top, means for adjustably connecting the transverse ways to the longitudinal ways, and means for adjustably connecting the stall frame parts to the transverse ways.

In testimony whereof I have hereunto set my hand and affixed my seal this 24th day of March, 1914.

HOWARD J. FERRIS.

In presence of the subscribing witnesses:
W. J. HEATLEY,
J. R. SMAK.

Copies of this patent may be obtained for five cents each, by addressing the "Commissioner of Patents, Washington, D. C."